(12) United States Patent
Finch, Jr. et al.

(10) Patent No.: US 10,119,873 B2
(45) Date of Patent: Nov. 6, 2018

(54) BRAKE FORCE SENSOR ARRANGEMENT FOR A BRAKE UNIT

(71) Applicant: Westinghouse Air Brake Technologies Corporation, Wilmerding, PA (US)

(72) Inventors: Glyn A. Finch, Jr., Simpsonville, SC (US); Maria Koon, Greenville, SC (US); Peter D. Mathern, Greenville, SC (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 112 days.

(21) Appl. No.: 14/486,157

(22) Filed: Sep. 15, 2014

(65) Prior Publication Data
US 2016/0076956 A1  Mar. 17, 2016

(51) Int. Cl.
*G01L 5/28* (2006.01)
*B60T 17/22* (2006.01)
*B60T 17/00* (2006.01)
*B60T 17/18* (2006.01)
*B61H 5/00* (2006.01)
*G01B 5/00* (2006.01)
*G01L 5/00* (2006.01)
*G01L 5/22* (2006.01)
*F16D 66/00* (2006.01)
*F16D 66/02* (2006.01)

(52) U.S. Cl.
CPC ............... *G01L 5/28* (2013.01); *B60T 17/00* (2013.01); *B60T 17/18* (2013.01); *B60T 17/22* (2013.01); *B60T 17/221* (2013.01); *B60T 17/223* (2013.01); *B60T 17/228* (2013.01); *B61H 5/00* (2013.01); *F16D 66/00* (2013.01); *F16D 66/027* (2013.01); *G01B 5/00* (2013.01); *G01B 5/0025* (2013.01); *G01B 5/0028* (2013.01); *G01L 5/00* (2013.01); *G01L 5/225* (2013.01)

(58) Field of Classification Search
CPC .......... B60T 17/00; B60T 17/18; B60T 17/22; B60T 17/221; B60T 17/223; B60T 17/228; F16D 66/00; F16D 66/005; F16D 66/027; G01B 5/00; G01B 5/0025; G01B 5/0028; G01L 5/00; G01L 5/225; G01L 5/28
USPC .................................................... 73/121, 132
See application file for complete search history.

(56) References Cited

U.S. PATENT DOCUMENTS 3,415,115 A   12/1968   Newell
3,443,842 A   5/1969    Pier
3,691,982 A   9/1972    Hawthorne
(Continued)

FOREIGN PATENT DOCUMENTS

AU      198544624       9/1986
DE      3543456 A1      6/1987
(Continued)

*Primary Examiner* — Manish S Shah
*Assistant Examiner* — Timothy Graves
(74) *Attorney, Agent, or Firm* — The Webb Law Firm

(57) ABSTRACT

A brake force sensor arrangement for a brake unit includes a brake unit including a brake force application member; and a strain gage positioned on the brake force application member. The strain gage may be configured to measure the stress, strain, or stress and strain of the brake force application member. The stress, strain, or stress and strain of the brake force application member may be proportional to the brake force applied by the brake unit.

16 Claims, 9 Drawing Sheets

(56) References Cited

U.S. PATENT DOCUMENTS

| | | | |
|---|---|---|---|
| 3,768,598 A | 10/1973 | Pollinger et al. | |
| 4,234,063 A * | 11/1980 | Blake | B66B 5/0006 |
| | | | 188/156 |
| 4,532,462 A | 7/1985 | Washbourn et al. | |
| 4,546,298 A | 10/1985 | Wickham et al. | |
| 4,757,300 A | 7/1988 | Sebalos | |
| 4,790,606 A | 12/1988 | Reinecke | |
| 4,799,740 A | 1/1989 | Iwaizako et al. | |
| 4,800,991 A | 1/1989 | Miller | |
| 4,805,740 A | 2/1989 | Wilke et al. | |
| 4,904,027 A | 2/1990 | Skantar et al. | |
| 4,953,668 A | 9/1990 | Severinsson | |
| 4,953,669 A | 9/1990 | Severinsson | |
| 5,003,829 A | 4/1991 | DeConti et al. | |
| 5,035,303 A | 7/1991 | Sullivan | |
| 5,087,907 A | 2/1992 | Weiler et al. | |
| 5,103,940 A | 4/1992 | Meneut et al. | |
| 5,201,834 A * | 4/1993 | Grazioli | B60T 8/885 |
| | | | 246/167 R |
| 5,206,625 A | 4/1993 | Davis | |
| 5,226,509 A | 7/1993 | Smith | |
| 5,244,061 A | 9/1993 | Hoyt et al. | |
| 5,255,760 A | 10/1993 | Lamb et al. | |
| 5,310,023 A | 5/1994 | Martinez | |
| 5,337,878 A | 8/1994 | Mehlert et al. | |
| 5,410,911 A | 5/1995 | Severinsson | |
| 5,419,620 A | 5/1995 | Keschwari-Rasti | |
| 5,433,296 A | 7/1995 | Webberley | |
| 5,441,128 A | 8/1995 | Hoyt | |
| 5,450,930 A | 9/1995 | Martens et al. | |
| 5,501,305 A | 3/1996 | Stalmeir et al. | |
| 5,632,359 A | 5/1997 | Camps et al. | |
| 5,689,231 A | 11/1997 | Olson | |
| 5,707,045 A | 1/1998 | Easter | |
| 5,753,807 A | 5/1998 | Trueman et al. | |
| 5,803,211 A | 9/1998 | Wilke | |
| 5,816,371 A | 10/1998 | Buckley et al. | |
| 5,825,287 A | 10/1998 | Zarybnicky, Sr. et al. | |
| 6,006,868 A | 12/1999 | Klink | |
| 6,135,242 A | 10/2000 | Hockley | |
| 6,145,633 A | 11/2000 | Niederstadt et al. | |
| 6,176,352 B1 | 1/2001 | Maron et al. | |
| 6,215,394 B1 | 4/2001 | Sellin | |
| 6,250,435 B1 | 6/2001 | Dellmann et al. | |
| 6,273,219 B1 | 8/2001 | Jackson | |
| 6,581,728 B2 | 6/2003 | Borugian | |
| 6,662,641 B2 | 12/2003 | Scorteanu et al. | |
| 6,722,477 B1 | 4/2004 | Wolfsteiner et al. | |
| 6,753,771 B2 | 6/2004 | Lesesky | |
| 6,776,266 B2 | 8/2004 | Fuglewicz et al. | |
| 6,776,268 B2 | 8/2004 | Hart | |
| 6,851,761 B2 | 2/2005 | Baumgartner et al. | |
| 6,871,916 B2 | 3/2005 | Stephane et al. | |
| 6,913,325 B2 | 7/2005 | Michel et al. | |
| 6,957,571 B2 | 10/2005 | Staltmeir et al. | |
| 7,014,019 B2 | 3/2006 | Krug et al. | |
| 7,055,660 B2 | 6/2006 | Friesen | |
| 7,114,596 B2 | 10/2006 | Borugian | |
| 7,114,597 B2 | 10/2006 | Siebke | |
| 7,175,006 B2 | 2/2007 | Plantan et al. | |
| 7,234,567 B2 | 6/2007 | Wagner et al. | |
| 7,398,141 B2 | 7/2008 | Steph et al. | |
| 7,413,061 B2 | 8/2008 | Wagner et al. | |
| 8,616,342 B2 | 12/2013 | Wallace et al. | |
| 9,156,449 B2 | 10/2015 | Nock | |
| 2003/0010132 A1 | 1/2003 | Scorteanu et al. | |
| 2004/0069055 A1 | 4/2004 | Staltmeir et al. | |
| 2005/0039988 A1 | 2/2005 | Philpott | |
| 2005/0258006 A1 | 11/2005 | Plantan et al. | |
| 2006/0151261 A1 | 7/2006 | Wagner et al. | |
| 2006/0180413 A1 | 8/2006 | Halasy-Wimmer et al. | |
| 2007/0227239 A1 * | 10/2007 | Perriard | B60T 13/66 |
| | | | 73/129 |
| 2007/0228815 A1 * | 10/2007 | Horiuchi | B60T 8/171 |
| | | | 303/112 |
| 2010/0025165 A1 | 2/2010 | Utzt et al. | |
| 2011/0139555 A1 | 6/2011 | Hori | |
| 2011/0174581 A1 * | 7/2011 | Vollert | F16D 55/22 |
| | | | 188/72.1 |
| 2011/0308897 A1 | 12/2011 | Wallace et al. | |
| 2012/0211312 A1 | 8/2012 | Engels | |
| 2013/0112515 A1 | 5/2013 | Shinagawa | |
| 2014/0027570 A1 * | 1/2014 | Tilman | B64C 25/00 |
| | | | 244/100 R |
| 2015/0090021 A1 | 4/2015 | Mayer | |

FOREIGN PATENT DOCUMENTS

| | | | |
|---|---|---|---|
| DE | 4418791 C1 | 8/1995 | |
| DE | 4425598 C1 | 12/1995 | |
| DE | 19509031 A1 | 9/1996 | |
| DE | 102008006487 A1 | 7/2009 | |
| DE | 102008015873 * | 10/2009 | B60T 17/228 |
| DE | 102008015873 A1 * | 10/2009 | B60T 8/52 |
| EP | 0531643 A2 | 3/1993 | |
| EP | 0674118 A1 | 9/1995 | |
| EP | 0794102 A1 | 9/1997 | |
| FR | 1225506 | 7/1960 | |
| FR | 2970454 A1 | 7/2012 | |
| GB | 1408479 | 10/1975 | |
| GB | 2269905 A | 2/1994 | |
| JP | 92244 A | 1/1997 | |
| JP | 10267055 A | 10/1998 | |
| JP | 10267767 A | 10/1998 | |
| JP | 2000052952 A | 2/2000 | |
| KR | 2005062955 * | 6/2005 | G01L 5/28 |
| KR | 100566500 * | 3/2006 | G01L 5/28 |
| WO | 2009118350 A2 | 10/2009 | |
| WO | 2013149744 A1 | 10/2013 | |

* cited by examiner

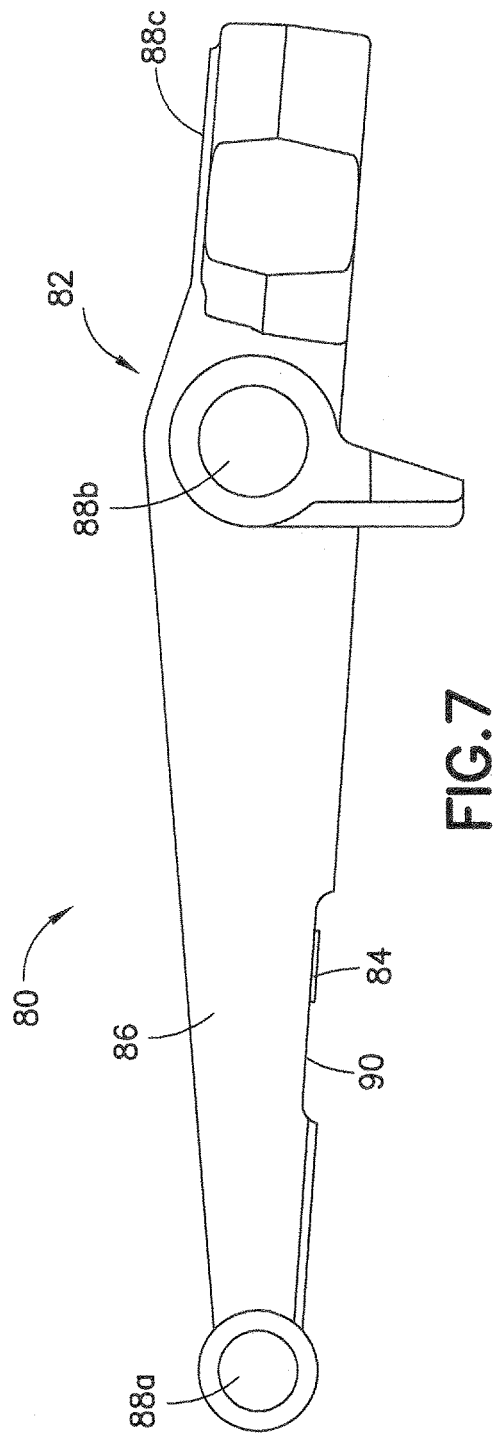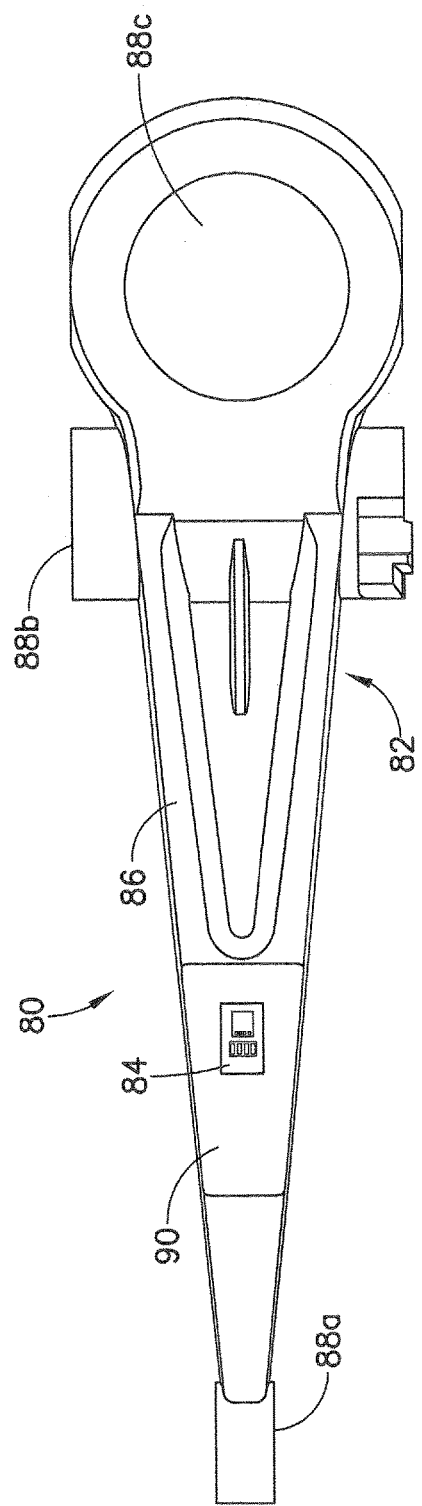
FIG.7
FIG.8

BRAKE FORCE SENSOR ARRANGEMENT FOR A BRAKE UNIT

BACKGROUND OF THE INVENTION

Field of the Invention

This disclosure relates generally to brake force sensor arrangements and, more particularly, to a brake force sensor arrangement for a brake unit of a railway vehicle.

Description of Related Art

Federal regulations for the inspection of brake units on railway vehicles now mandate that each commuter and short-distance intercity passenger train shall receive a Class I brake test at least once during each calendar day that the train is placed or continues in service. Therefore, transit authorities manually inspect the brake systems on passenger trains on a periodic basis to ensure they are working properly. Operators must apply pressurized fluid to the braking system and ensure that the brake pads on the calipers of the disc brake units or the brake shoe of the tread brake units properly contact the disc surface or treads of the wheels of the railway vehicle. Train operators must walk the length of the train and visually verify pad-to-disc or shoe-to-tread contact. During these inspections, it is often difficult for the operator to see and properly identify brake application, especially on cars in which the brake units are located in-board of the railway vehicle. When the brake units are positioned in-board of the railway vehicle, it is often necessary for the operator to inspect the brake units using a pit or maintenance facility to gain access to the in-board portion of the railway vehicle. Further, the inspection of the brake units is very time consuming.

The proper function of the brake units can be checked by monitoring air pressure or piston travel of the brake units, but these methods are not always reliable. Occasionally, air pressure or piston travel is present but no force is being applied to the brakes, such as if the brake unit is jammed or the brake shoe/pads are missing. Ultimately, measuring the brake force of the brake unit directly is the best way to verify that the brakes are working properly.

In view of the foregoing, a need exists for a brake force sensor arrangement that eliminates the need for periodic manual inspection of the brake system on railway vehicles. A further need exists for a brake force sensor arrangement that provides an individual with additional information about the performance of the brake system and that aids in identifying brake units that are not functioning properly.

SUMMARY OF THE INVENTION

In one embodiment, a brake force sensor arrangement for a brake unit may include a brake unit including a brake force application member; and a strain gage positioned on the brake force application member. The strain gage may be configured to measure the stress, strain, or stress and strain of the brake force application member. The stress, strain, or stress and strain of the brake force application member may be proportional to the brake force applied by the brake unit.

The brake unit may include a disc brake unit. The brake force application member may include a lever rotatably positioned in the brake unit. The lever may rotate relative to the brake unit to apply a braking force. The lever may define a recess configured to hold the strain gage. A notification device may be connected to the strain gage. Information from the strain gage may be directed to the notification device to identify the amount of brake force applied by the brake unit. An environmental coating may be provided on the strain gage.

The brake unit may include a tread brake unit. The brake force application member may include a lever rotatably positioned in the brake unit. The lever may rotate relative to the brake unit to apply a braking force. The lever may define a recess configured to hold the strain gage. A notification device may be connected to the strain gage. Information from the strain gage may be directed to the notification device to identify the amount of brake force applied by the brake unit. An environmental coating may be provided on the strain gage.

In another embodiment, a railway vehicle with a brake force sensor arrangement may include a railway vehicle including a brake unit including a brake force application member, and a strain gage positioned on the brake force application member. The strain gage may be configured to measure the stress, strain, or stress and strain of the brake force application member. The stress, strain, or stress and strain of the brake force application member may be proportional to the brake force applied by the brake unit.

The brake unit may include a disc brake unit. The brake force application member may include a lever rotatably positioned in the brake unit. The lever may rotate relative to the brake unit to apply a braking force. The lever may define a recess configured to hold the strain gage. A notification device may be connected to the strain gage. Information from the strain gage may be directed to the notification device to identify the amount of brake force applied by the brake unit. An environmental coating may be provided on the strain gage.

The brake unit may include a tread brake unit. The brake force application member may include a lever rotatably positioned in the brake unit. The lever may rotate relative to the brake unit to apply a braking force. The lever may define a recess configured to hold the strain gage. A notification device may be connected to the strain gage. Information from the strain gage may be directed to the notification device to identify the amount of brake force applied by the brake unit. An environmental coating may be provided on the strain gage.

In a further embodiment, a method of measuring a brake force applied by a brake unit may include the steps of: providing a brake unit including a brake force application member, and a strain gage positioned on the brake force application member; applying a braking force using the brake force application member; and measuring the stress, strain, or stress and strain of the brake force application member using the strain gage. The stress, strain, or stress and strain of the brake force application member may be proportional to a brake force applied by the brake unit. The method may further include the step of sending information relating to the stress, strain, or stress and strain measured by the strain gage to a notification device.

Further details and advantages will be understood from the following detailed description read in conjunction with the accompanying drawings.

BRIEF DESCRIPTION OF THE DRAWINGS

FIG. 7 is a side view of the brake force sensor arrangement of FIG. 6;

FIG. 8 is a bottom view of the brake force sensor arrangement of FIG. 6;

DESCRIPTION OF THE DISCLOSURE

Figure 1:
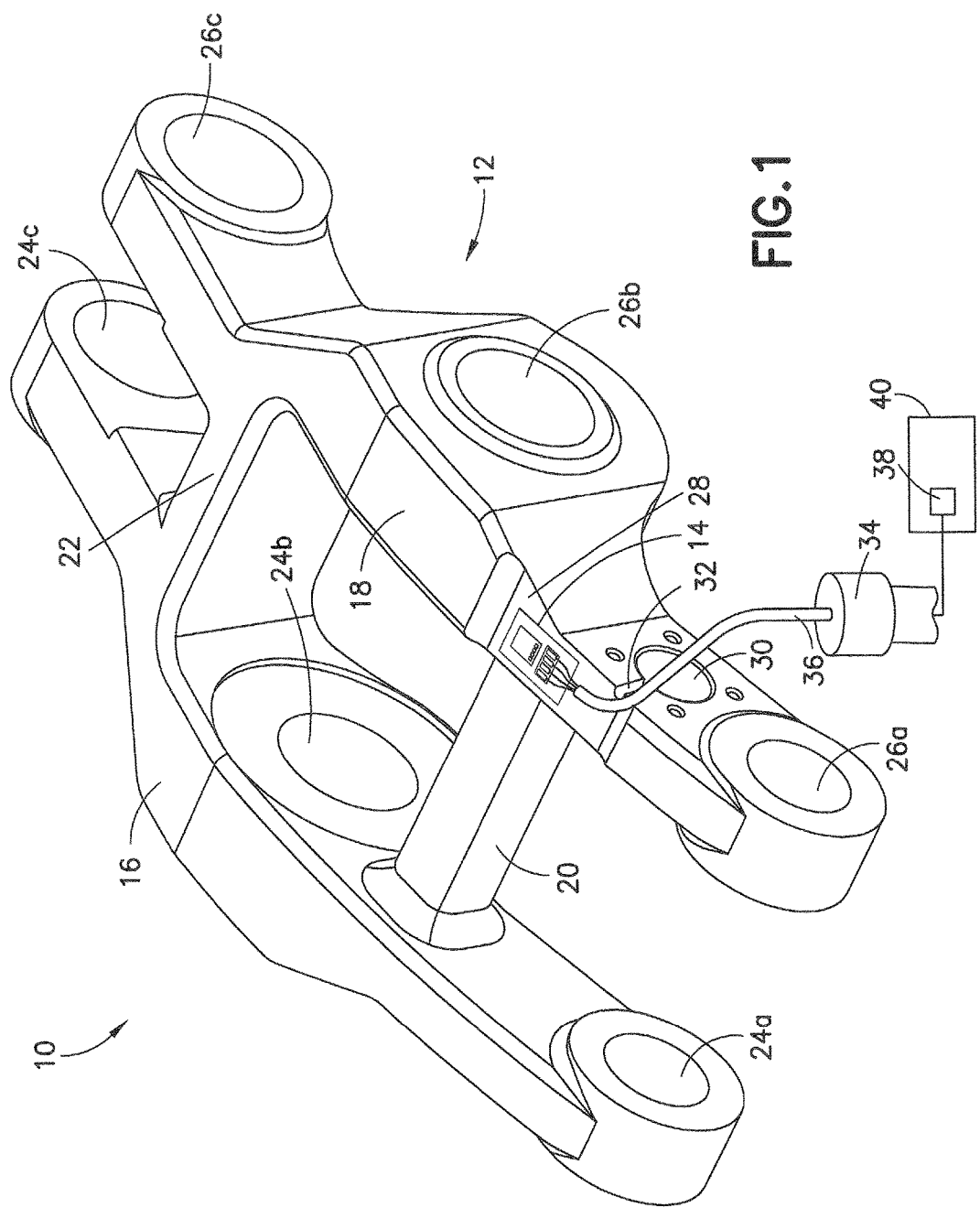
FIG. 1 is a front perspective view of a brake force sensor arrangement for a brake unit in accordance with one embodiment of the present disclosure.
Figure 2:
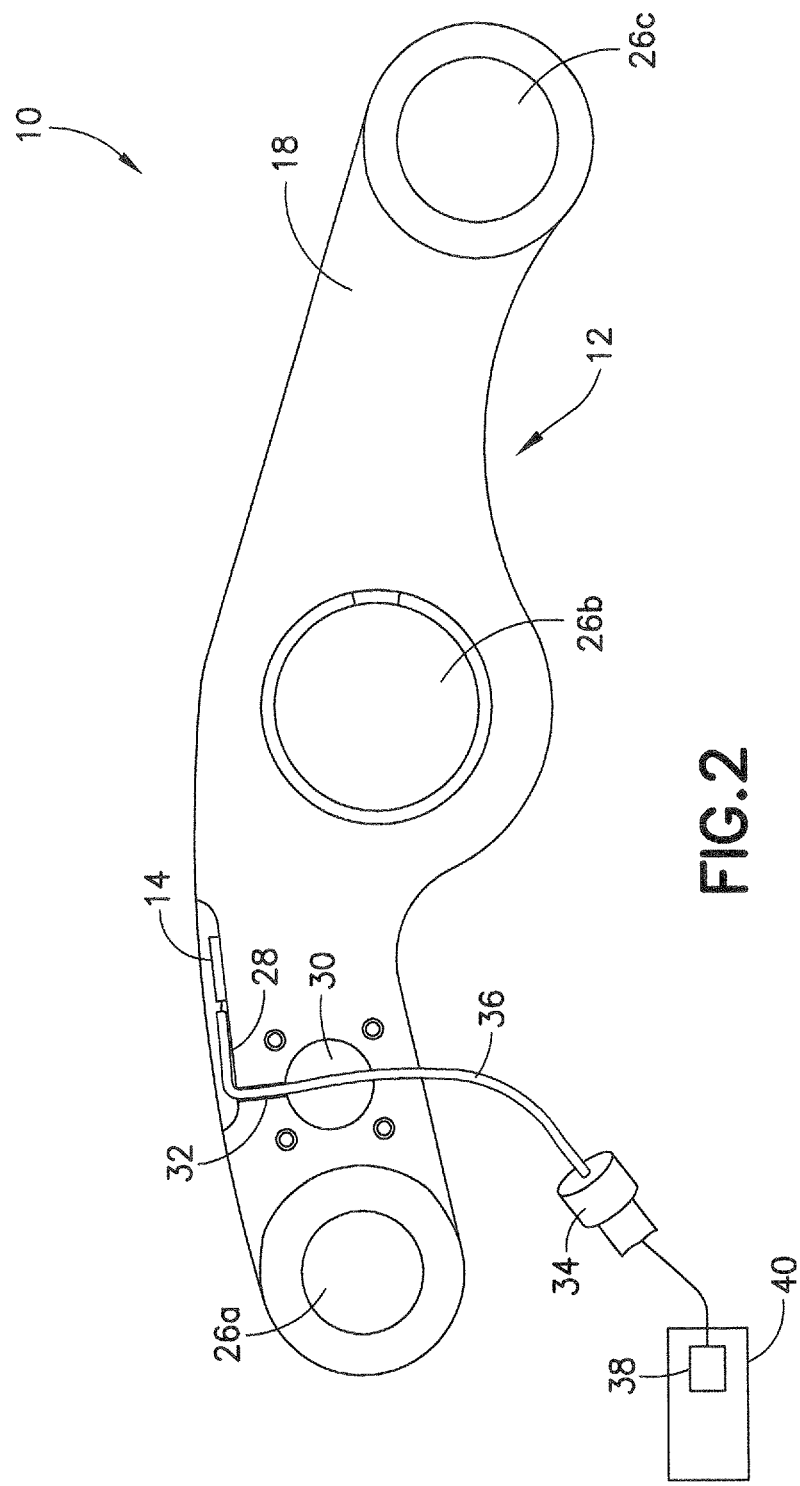
FIG. 2 is a side view of the brake force sensor arrangement of FIG. 1.
Figure 3:
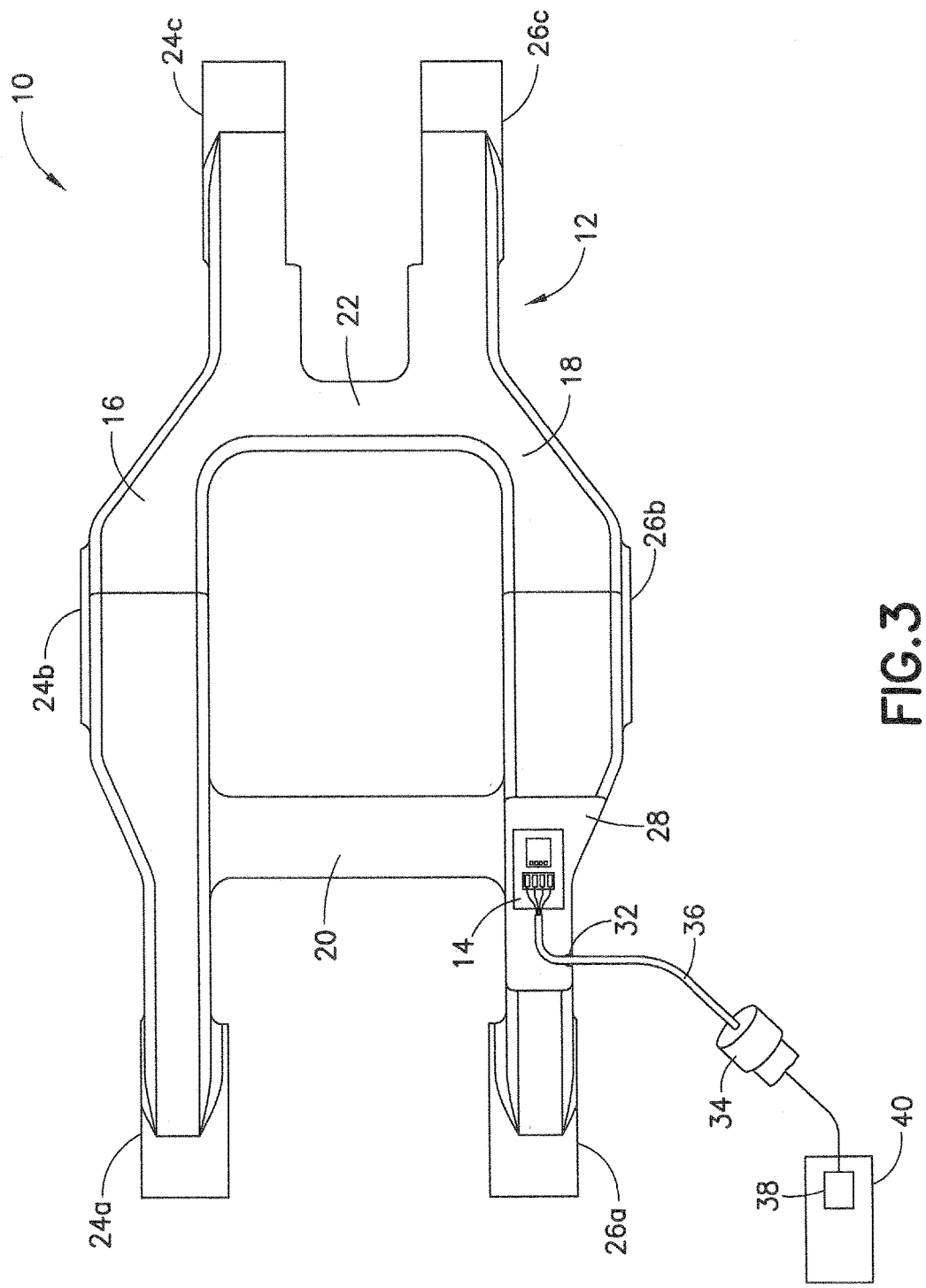
FIG. 3 is a top view of the brake force sensor arrangement of FIG. 1.

For purposes of the description hereinafter, spatial orientation terms, as used, shall relate to the referenced embodiment as it is oriented in the accompanying drawings, figures, or otherwise described in the following detail description. However, it is to be understood that the embodiments described hereinafter may assume many alternative variations and configurations. It is also to be understood that the specific components, devices, features, and operational sequences illustrated in the accompanying drawings, figures, or otherwise described herein are simply exemplary and should not be considered as limiting.

The present disclosure is directed to, in general, a brake force sensor arrangement for a brake unit and, in particular, to a brake force sensor arrangement for a brake unit of a railway vehicle including a strain gage. Certain preferred and non-limiting embodiments of the components of the brake force sensor arrangement are illustrated in FIGS. 1-10.

With reference to FIGS. 1-4, a brake force sensor arrangement 10 (hereinafter referred to as "arrangement 10") is shown. In one embodiment, the arrangement 10 may include a brake force application member or lever 12 and a strain gage 14. It is to be understood that the strain gage 14 may be any strain gage typically used to measure the strain and/or stress in an object as will be readily apparent to one of skill in the art. The lever 12 may be a lever typically used in disc brake units commonly used on railway vehicles. It is to be understood, however, that alternative types of levers may be used, including levers or load-bearing members used in conjunction with bicycles, cars, buses, and other types of vehicles that use brake pads for effecting a braking force to a brake disc. The lever 12 may include a first frame member 16 and a second frame member 18 that extend parallel to one another. A first cross member 20 and a second cross member 22 may extend between the first frame member 16 and the second frame member 18. The first cross member 20 and the second cross member 22 may extend perpendicular to the first frame member 16 and the second frame member 18. The first frame member 16 may define at least three apertures 24a, 24b, 24c configured to extend therethrough and receive portions of a brake unit, as will be described in greater detail hereinbelow. The second frame member 18 may define at least three apertures 26a, 26b, 26c configured to extend therethrough and receive portions of a brake unit, as will be described in greater detail hereinbelow. The apertures 24a, 24b, 24c of the first frame member 16 may be positioned in line with the apertures 26a, 26b, 26c of the second frame member 18 to hold a component of the brake unit therebetween.

In one embodiment, the strain gage 14 may be positioned on the second frame member 18. It is to be understood, however, that the strain gage 14 may be positioned on different portions of the second frame member 18 or on a different structure of the lever 12. A top surface of the second frame member 18 may define a recess 28. The strain gage 14 may be positioned in the recess 28. It is also contemplated that the strain gage 14 may be positioned on the second frame member 18 without the need for a recess. However, by positioning the strain gage 14 in the recess 28, the strain gage 14 is protected from being contacted by other components of the brake unit or lever 12. The strain gage 14 may be welded on to the second frame member 18 or adhesively attached to the second frame member 18, among other methods of attachment, such as fasteners. In one embodiment, an environmental coating may be applied to the strain gage 14 for additional protection from damage. The strain gage 14 may be configured to measure the strain and/or stress in the second frame member 18 of the lever 12. By identifying the strain and/or stress in the second frame member 18, the brake force being applied by the brake unit may be determined. In one embodiment, the strain gage 14 may be rectangular. However, it is to be understood that the size and shape of the strain gage 14 may vary depending on the geometry of the lever 12 and the available space.

Figure 4:
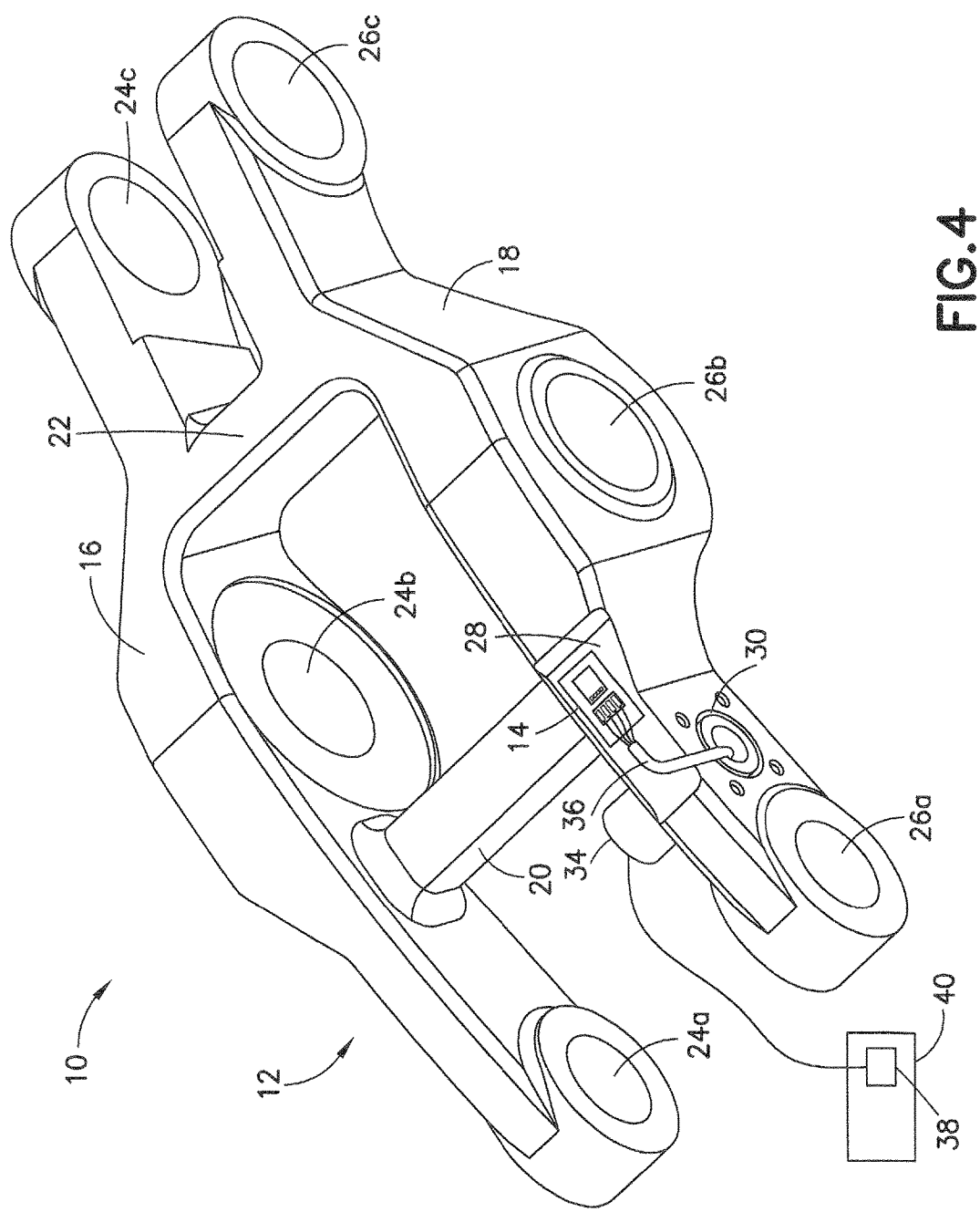
FIG. 4 is a front perspective view of the brake force sensor arrangement of FIG. 1 showing a connector inserted therein.

The second frame member 18 may define another aperture 30 on a side of the second frame member 18. The aperture 30 may extend through the second frame member 18. The second frame member 18 may also define a channel 32 that extends from a top surface of the second frame member 18 to the aperture 30 on the side of the second frame member 18. The channel 32 may be defined in the side of the second frame member 18. As shown in FIG. 4, the aperture 30 may be configured to house a connector 34. In one embodiment, the connector 34 may be positioned towards the inside of the lever 12 to protect the connector 34 from contacting other components in the brake unit. It is also contemplated that the connector 34 may be positioned on the outside of the lever 12. A cable 36 may operatively connect the connector 34 to the strain gage 14. The cable 36 may be positioned in the channel 32 to avoid contact with other components of the brake unit. The strain gage 14 may send information regarding the stress and/or strain of the lever 12 to a notification device 38 via the connector 34. The notification device 38 may be configured to perform several different tasks, including converting the amount of stress and/or strain of the lever 12 into a brake force amount and relaying this information to an operator on a railway vehicle 40. The stress and/or strain of the lever 12 may be proportional to the brake force of the brake unit. The notification device 38 may be provided at a location on the railway vehicle 40. The notification device 38 may be an indicator panel provided directly on the brake unit, a remote handheld unit held by an operator of the railway vehicle 40, a control panel of the railway vehicle 40, or a control panel and/or a central processing unit (CPU) provided in a railway monitoring station. It is to be understood that the strain gage 14 may send the signal information through a wired connection or remotely to the notification device 38. The strain gage 14 or connector 34 may be connected to a remote signal emitting device (not shown) or hard-wired into a control panel and/or CPU.

Figure 5:
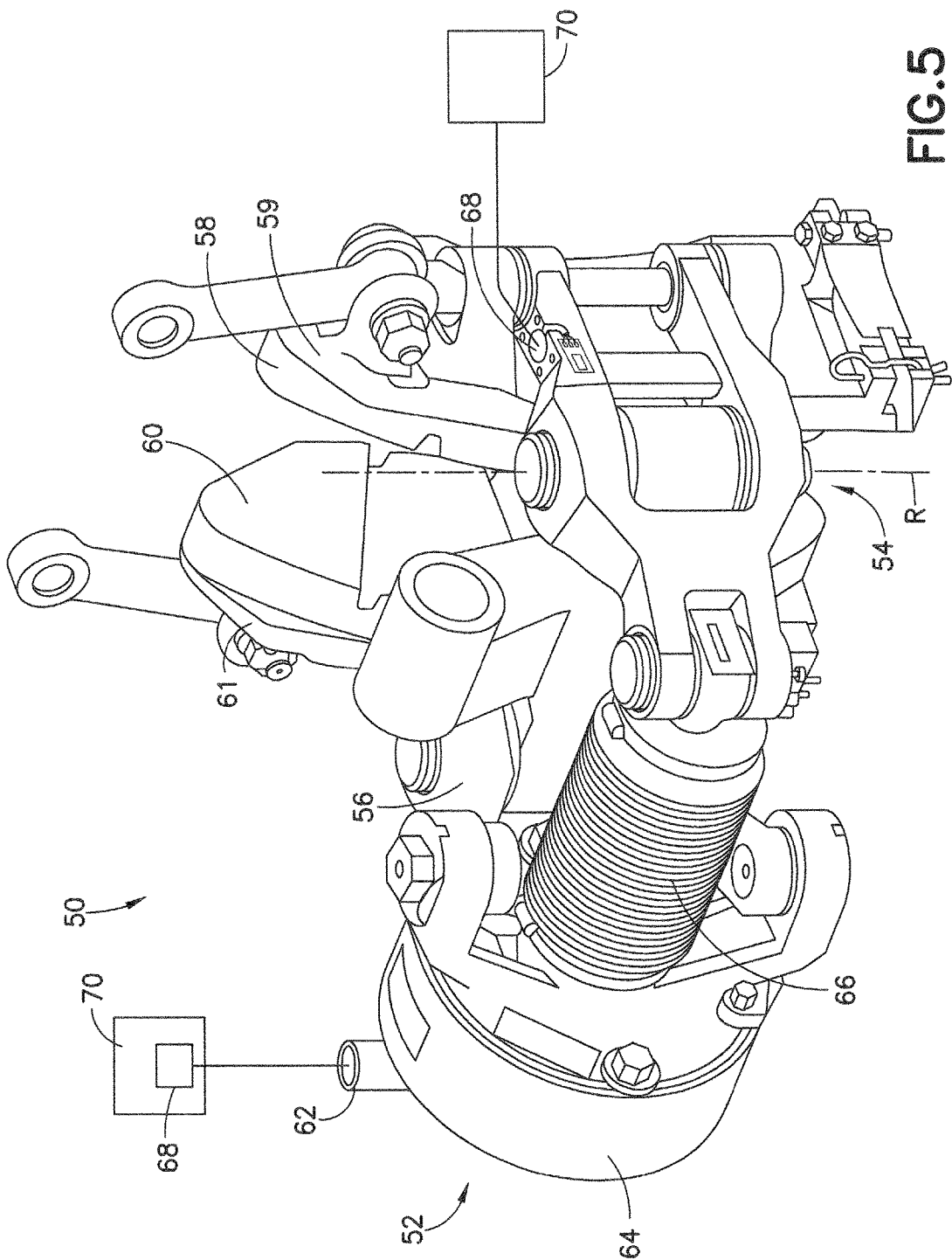
FIG. 5 is a front perspective view of a brake unit in accordance with one embodiment of the present disclosure including the brake force sensor arrangement of FIG. 1.
Figure 6:
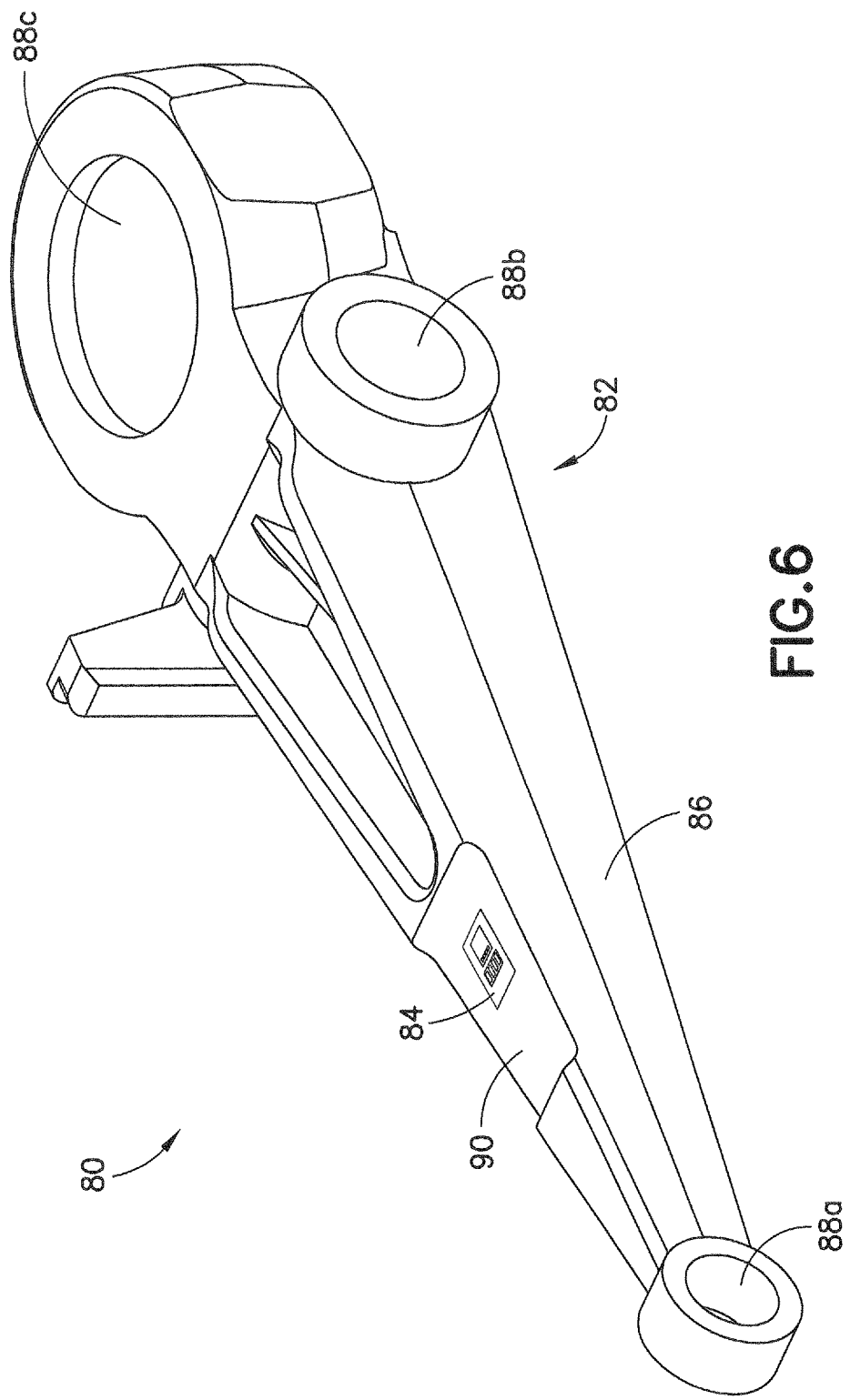
FIG. 6 is a side perspective view of a brake force sensor arrangement for a brake unit in accordance with one embodiment of the present disclosure.

With reference to FIG. 5, a brake unit 50 is shown. In one embodiment, the brake unit 50 may be a disc brake unit commonly used on railway vehicles. It is to be understood, however, that alternative types of brake units may be used, including disc brake units used in conjunction with bicycles, cars, buses, and other types of vehicles that use brake pads for effecting a braking force to a brake disc. The brake unit 50 may include an actuator 52, a first lever 54, a second lever 56, and at least two brake pads 58, 60. The brake pads 58, 60 may be operatively connected to a first brake head 59 of the first lever 54 and a second brake head 61 of the second lever 56, respectively. In one embodiment, the first lever 54 corresponds to the lever 12 shown in FIGS. 1-4. One end of the first lever 54 may be connected to one end of the actuator 52 and an opposing end of the first lever 54 may be connected to the first brake head 59. One end of the second lever 56 may be connected to an opposing end of the actuator 52 and an opposing end of the second lever 56 may be connected to the second brake head 61.

The actuator 52 may include an inlet 62, a cylinder 64, and a bellows 66. The inlet 62 may be in fluid communication with a pressurized fluid source 72 on a railway vehicle 74. A piston (not shown) may be positioned in the cylinder 64. During operation of the brake unit 50, pressurized fluid is supplied to the cylinder 64 of the actuator 52 via the inlet 62. The pressurized fluid pushes the piston in a longitudinal direction. The first lever 54 may be connected to one end of the actuator 52 so as the piston moves in the longitudinal direction, the end of the first lever 54 connected to the actuator 52 may be rotated about a rotational axis R. Similarly, the second lever 56 may also be rotated. As the levers 54, 56 are rotated, the brake pads 58, 60 are brought into contact with a brake disc (not shown) of the railway vehicle 74. The friction created between the brake pads 58, 60 and the brake disc allow the railway vehicle 74 to reduce the traveling speed and/or bring the railway vehicle 74 to a stop.

A strain gage 68 positioned on the first lever 54 may be configured to measure the amount of brake force that is applied to the first brake pad 58 based on the strain and/or stress experienced by the first lever 54. As the first lever 54 is rotated, the first brake pad 58 begins to contact the wheel of the railway vehicle. The strain and/or stress may become greater as the actuator 52 continues to rotate and apply pressure to the first lever 54. The strain gage 68 may identify the stress and/or strain experienced by the first lever 54 and supply this information to a notification device 70. The notification device 70 may be configured to perform several different tasks, including converting the amount of stress and/or strain of the lever 54 into a brake force amount and relaying this information to an operator on the railway vehicle 74. The stress and/or strain of the lever 12 may be proportional to the brake force of the brake unit. In turn, the notification device 70 may inform an operator of the railway vehicle 74 of the amount of brake force being applied by the brake pad 58 to the brake disc of the railway vehicle 74. By using this brake force sensor arrangement with the brake unit 50, it is no longer necessary for an operator to inspect the brake units from underneath of or below the railway vehicle 74. The brake force of the brake unit may be tested remotely or directly from the outside of the railway vehicle 74 without the need for a pit or maintenance facility to inspect an in-board brake unit.

With reference to FIGS. 6-9, another embodiment of a brake force sensor arrangement 80 (hereinafter referred to as "arrangement 80") is shown. In one embodiment, the arrangement 80 may include a brake force application member or lever 82 and a strain gage 84. It is to be understood that the strain gage 84 may be any strain gage typically used to measure the strain and/or stress in an object as will be readily apparent to one of skill in the art. The lever 82 may be a lever typically used in tread brake units commonly used on railway vehicles. It is to be understood, however, that alternative types of levers or load-bearing members may be used, including levers used in conjunction with bicycles, cars, buses, and other types of vehicles that use load-bearing members for effecting a braking force to a wheel. The lever 82 may include a body 86 that defines at least three apertures 88a, 88b, 88c. A first and second aperture 88a, 88b may extend parallel to one another through a longitudinal length of the body 86 and may be configured to hold separate components of a brake unit (as will be discussed in greater detail below). A third aperture 88c may extend perpendicularly through a longitudinal length of the body 86 and also may be configured to hold a separate component of a brake unit.

In one embodiment, the strain gage 84 may be positioned on the body 86 of the lever 82. A bottom surface of the lever 82 may define a recess 90. The strain gage 84 may be positioned in the recess 90. It is to be understood, however, that the strain gage 84 may also be positioned on a different location of the lever 82. It is also contemplated that the strain gage 84 may be positioned on the bottom surface of the lever 82 without the need for a recess defined in the bottom surface of the lever 82. However, by positioning the strain gage 84 in the recess 90, the strain gage 84 is protected from being contacted by other components of the brake unit. The strain gage 84 may be welded to the lever 82 or adhesively attached to the lever 82, among other methods of attachment, such as fasteners. In one embodiment, an environmental coating may be applied to the strain gage 84 for additional protection from damage. The strain gage 84 may be configured to measure the strain and/or stress in the lever 82. By identifying the strain and/or stress in the lever 82, the brake force being applied by the brake unit to the lever 82 may be determined. In one embodiment, the strain gage 84 may be rectangular. However, it is to be understood that the size and shape of the strain gage 84 may vary depending on the geometry of the lever 82 and the available space.

Figure 9:
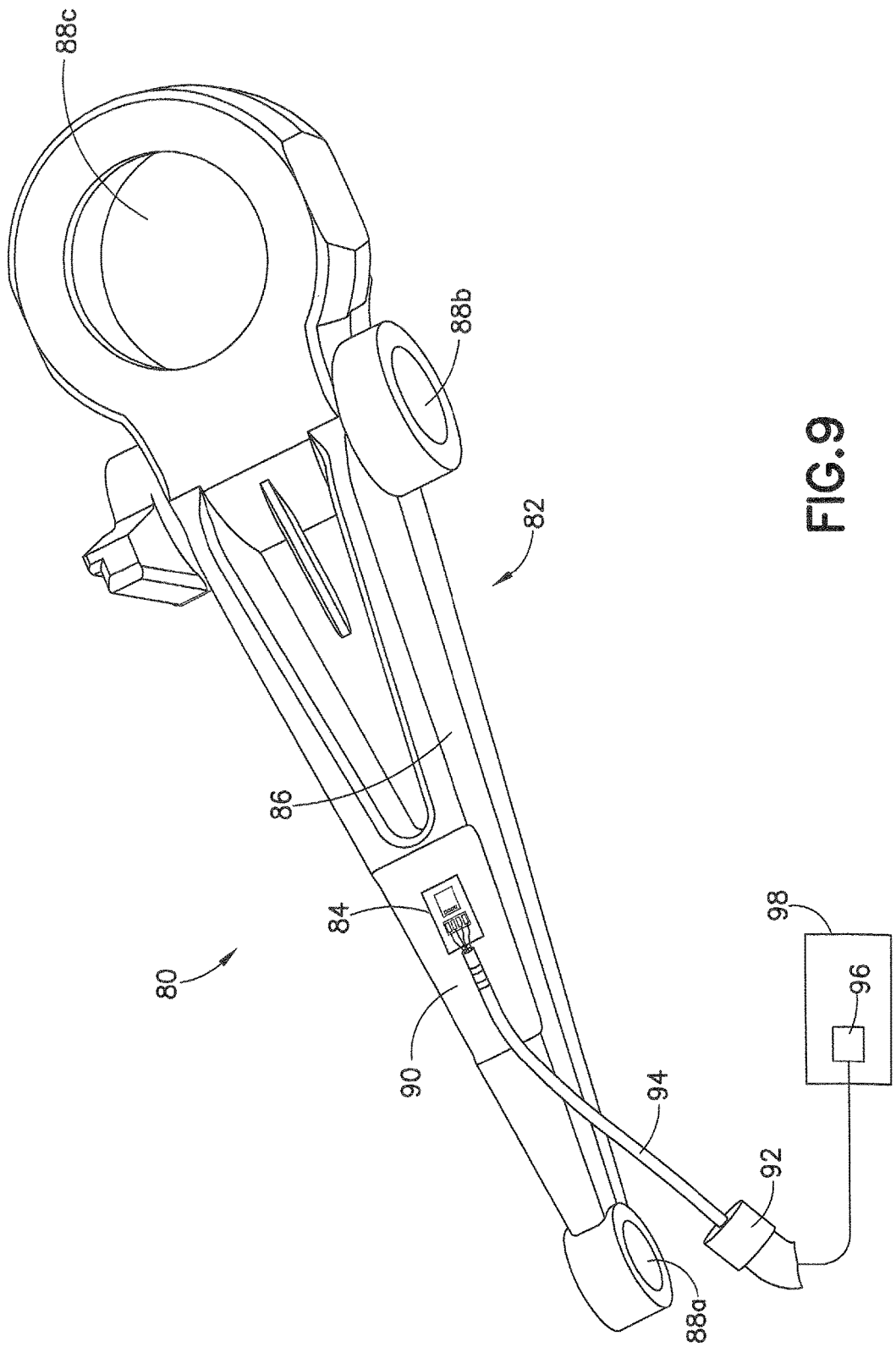
FIG. 9 is a bottom perspective view of the brake force sensor arrangement of FIG. 6 including a connector.

As shown in FIG. 9, a connector 92 may be connected to the strain gage 84. A cable 94 may operatively connect the connector 92 to the strain gage 84. The strain gage 84 may send information regarding the stress and/or strain of the lever 82 to a notification device 96 via the connector 92. The notification device 96 may be configured to perform several different tasks, including converting the amount of stress and/or strain of the lever 82 into a brake force amount and relaying this information to an operator on a railway vehicle 40 The stress and/or strain of the lever 82 may be proportional to the brake force of the brake unit. The notification device 96 may be provided at a location on a railway vehicle 98. The notification device 96 may be an indicator panel provided directly on the brake unit, a remote handheld unit held by an operator of the railway vehicle 98, a control panel of the railway vehicle 98, or a control panel and/or a central processing unit (CPU) provided in a railway monitoring station. It is to be understood that the strain gage 84 may send the signal information through a wired connection or remotely to the notification device 96. The strain gage 84 or connector 92 may be connected to a remote signal emitting device (not shown) or hard-wired into a control panel and/or CPU.

Figure 10:
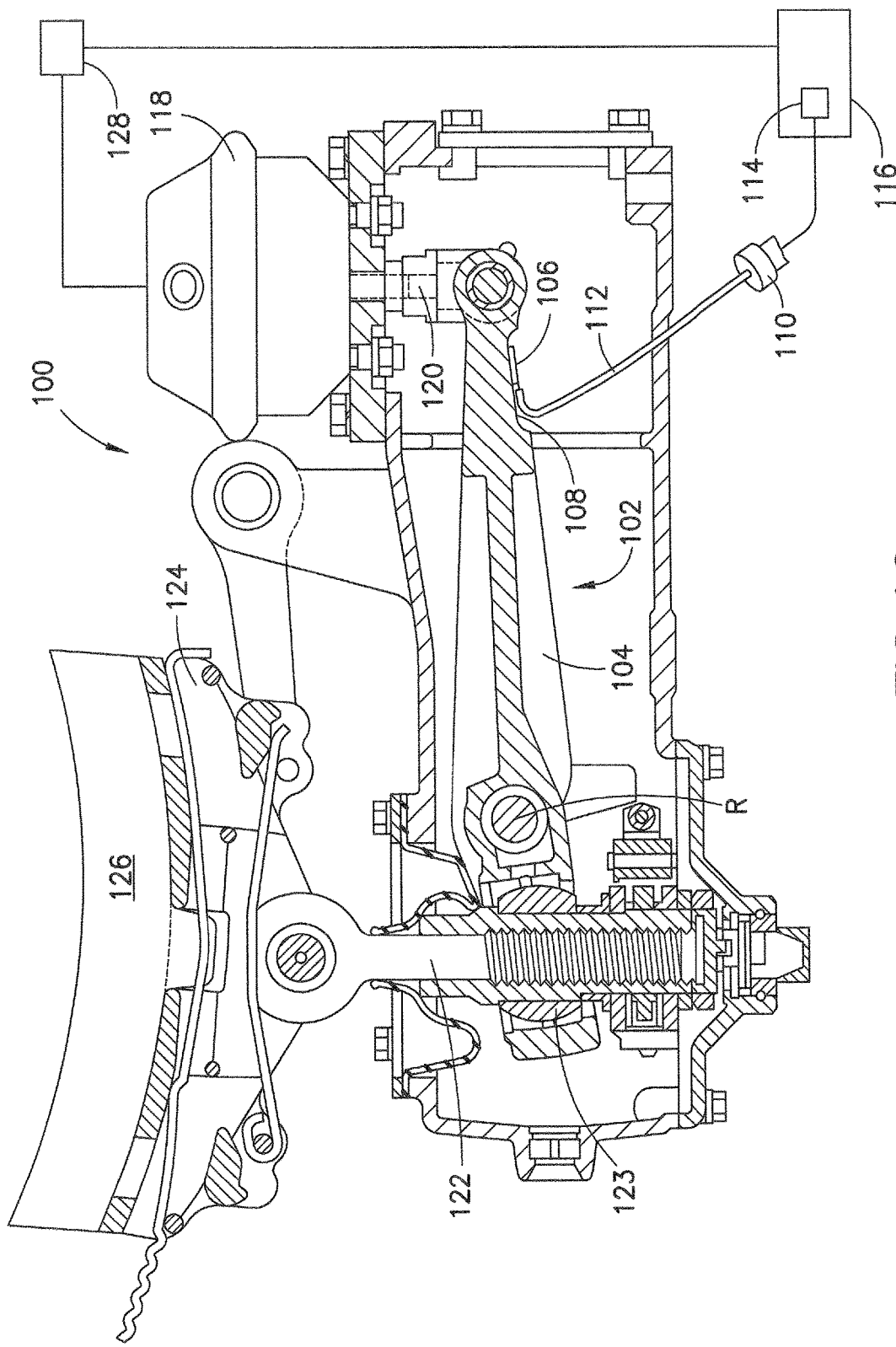
FIG. 10 is a cross-sectional view of a brake unit in accordance with an embodiment of the present disclosure including the brake force sensor arrangement of FIG. 6.

With reference to FIG. 10, a brake unit 100 is shown in conjunction with a brake force sensor arrangement 102. In one embodiment, the brake unit 100 may be a tread brake unit commonly used on railway vehicles. It is to be understood, however, that alternative types of brake units may be used, including tread brake units or drum brake units used in conjunction with bicycles, cars, buses, and other types of vehicles that use a load-bearing member for effecting a braking force to a wheel. In one embodiment, the brake force sensor arrangement 102 may be the brake force sensor arrangement 80 shown in FIGS. 6-9. The brake force sensor arrangement 102 may include a lever 104 and a strain gage 106. A surface of the lever 104 may define a recess 108. The strain gage 106 may be positioned in the recess 108 of the lever 104. The strain gage 106 may be operatively connected to a connector 110 via a cable 112. The connector 110 may be connected to a notification device 114 provided on a railway vehicle 116. The interaction and operation of the strain gage 106, connector 110, and notification device 114 are described hereinabove.

The brake unit 100 may also include an air chamber 118, a piston rod 120, a spindle 122, a brake head 124, and a brake shoe 126. The air chamber 118 may be in fluid communication with a pressurized fluid source 128 on the railway vehicle 116. The fluid source 128 may supply pressurized fluid to the air chamber 118. One end of the piston rod 120 may be connected to the air chamber 118 and an opposing end of the piston rod 120 may be connected to an end of the lever 104 via a clevis or another attachment member. An opposing end of the lever 104 may be connected to an end of the spindle 122 via a spherical bearing 123 or some other similar means. An opposing end of the spindle 122 may be connected to the brake head 124. The brake shoe 126 may be positioned on a top surface of the brake head 124.

During operation of the railway vehicle 116, it may become necessary to apply a braking force to the wheels of the railway vehicle 116. In this instance, pressurized fluid from the fluid source 128 is supplied to the air chamber 118. The pressurized fluid causes the piston rod 120 to extend from the air chamber 118 towards the lever 104. In turn, the lever 104 is rotated clockwise about rotation point R relative to the brake unit 100 via the connection to the piston rod 120. Since the lever 104 is also pivotally connected to the spindle 122, as the lever 104 is rotated clockwise via the piston rod 120, the lever 104 also moves the spindle 122 in an upward direction relative to the lever 104. As the spindle 122 is moved upward, the brake shoe 126 positioned on the brake head 124 is moved into braking contact with the wheel of railway vehicle 116 to effect a braking action on the wheel.

The strain gage 106 positioned on the lever 104 may be configured to measure the amount of brake force that is applied by the brake shoe 126 on the wheel of the railway vehicle 116 based on the strain and/or stress experienced by the lever 104. As the lever 104 is rotated relative to the brake unit 100, the brake shoe 126 begins to contact the wheel of the railway vehicle 116. The strain and/or stress may become greater as the piston rod 120 continues to effect the rotation of the lever 104 and the pressure exerted by the lever 104 is increased. The strain gage 106 may be configured to measure this strain and/or stress. The notification device 114 may identify the brake force applied by the brake shoe 126 based on the stress and/or strain in the lever 104. The strain gage 106 may then supply this information to the notification device 114 via the connector 110. In turn, the notification device 114 may inform an operator of the railway vehicle 116 of the amount of brake force being applied by the brake shoe 126 to the wheel of the railway vehicle 116. By using this brake force sensor arrangement 102 with the brake unit 100, it is no longer necessary for an operator to manually inspect the brake units of the railway vehicle 116. The brake force of the brake unit 100 may be tested remotely or directly from outside of the railway vehicle 116, thereby saving time and money during inspections.

While embodiments of a brake force sensor arrangement for a brake unit are shown in the accompanying figures and described hereinabove in detail, other embodiments will be apparent to, and readily made by, those skilled in the art without departing from the scope and spirit of the invention. Accordingly, the foregoing description is intended to be illustrative rather than restrictive. The invention described hereinabove is defined by the appended claims and all changes to the invention that fall within the meaning and range of equivalency of the claims are to be embraced within their scope.

The invention claimed is:

1. A brake force sensor arrangement for a brake unit, comprising:
    the brake unit comprising a brake force application member; and
    a strain gage positioned on the brake force application member,
    wherein the strain gage is configured to measure the stress and/or strain of the brake force application member;
    wherein the stress and/or strain of the brake force application member is proportional to a brake force applied by the brake unit; and
    wherein the brake force application member defines a recess on an outer surface thereof to hold the strain gage, and an aperture that houses a connector configured to send information from the strain gage to a notification device.

2. The brake force sensor arrangement as claimed in claim 1,
    the brake force unit further comprising a disc brake unit; and
    the brake force application member further comprising a lever rotatably positioned in the brake unit,
    wherein the lever rotates relative to the brake unit to apply the braking force.

3. The brake force sensor arrangement as claimed in claim 2, further comprising the notification device connected to the strain gage,
    wherein information from the strain gage is directed to the notification device to identify the amount of brake force applied by the brake unit.

4. The brake force sensor arrangement as claimed in claim 2, further comprising an environmental coating provided on the strain gage.

5. The brake force sensor arrangement as claimed in claim 1,
    the brake unit further comprising a tread brake unit; and
    the brake force application member further comprising a lever rotatably positioned in the brake unit,
    wherein the lever rotates relative to the brake unit to apply the braking force.

6. The brake force sensor arrangement as claimed in claim 5, further comprising the notification device connected to the strain gage,
    wherein information from the strain gage is directed to the notification device to identify the amount of brake force applied by the brake unit.

7. The brake force sensor arrangement as claimed in claim 5, further comprising an environmental coating provided on the strain gage.

8. A railway vehicle with a brake force sensor arrangement, comprising:

a railway vehicle comprising a brake unit, the brake unit comprising a brake force application member; and a strain gage positioned on the brake force application member, wherein the strain gage is configured to measure a stress and/or strain of the brake force application member, wherein the stress and/or strain of the brake force application member is proportional to a brake force applied by the brake unit; and wherein the brake force application member defines a recess on an outer surface thereof to hold the strain gage, and an aperture that houses a connector configured to send information of a notification device.

9. The railway vehicle as claimed in claim 8, the brake unit further comprising a disc brake unit; and the brake force application member further comprising a lever rotatably positioned in the brake unit, wherein the lever rotates relative to the brake unit to apply the braking force.

10. The railway vehicle as claimed in claim 9, further comprising the notification device connected to the strain gage, wherein information from the strain gage is directed to the notification device to identify the amount of brake force applied by the brake unit.

11. The railway vehicle as claimed in claim 9, further comprising an environmental coating provided on the strain gage.

12. The railway vehicle as claimed in claim 8, the brake unit further comprising a tread brake unit; and the brake force application member further comprising a lever rotatably positioned in the brake unit, wherein the lever rotates relative to the brake unit to apply the braking force.

13. The railway vehicle as claimed in claim 12, further comprising the notification device connected to the strain gage, wherein information from the strain gage is directed to the notification device to identify the amount of brake force applied by the brake unit.

14. The railway vehicle as claimed in claim 12, further comprising an environmental coating provided on the strain gage.

15. A method of measuring a brake force applied by a brake unit, comprising the steps of:

a) providing a brake unit comprising:

a brake force application member; and a strain gage positioned on the brake force application member;

wherein the braking force application member defines a recess on an outer surface thereof to hold the strain gage, and an aperture that houses a connector configured to send information for a notification device;

b) applying the braking force using the brake force application member; and c) measuring the stress and/or strain applied by the brake force application member using the strain gage, wherein the stress and/or strain of the brake force application member is proportional to the brake force applied by the brake unit.

16. The method of measuring a brake force applied by the brake unit as claimed in claim 15, further comprising the step of sending information relating to the stress and/or strain measured by the strain gage to the notification device.

* * * * *